Sept. 22, 1970   K. F. HALL   3,529,841
ALIGNMENT DEVICES

Filed Aug. 30, 1968   3 Sheets-Sheet 1

Inventor
Kenneth Frank Hall
BY Watson, Cole, Grindle & Watson
Attorneys

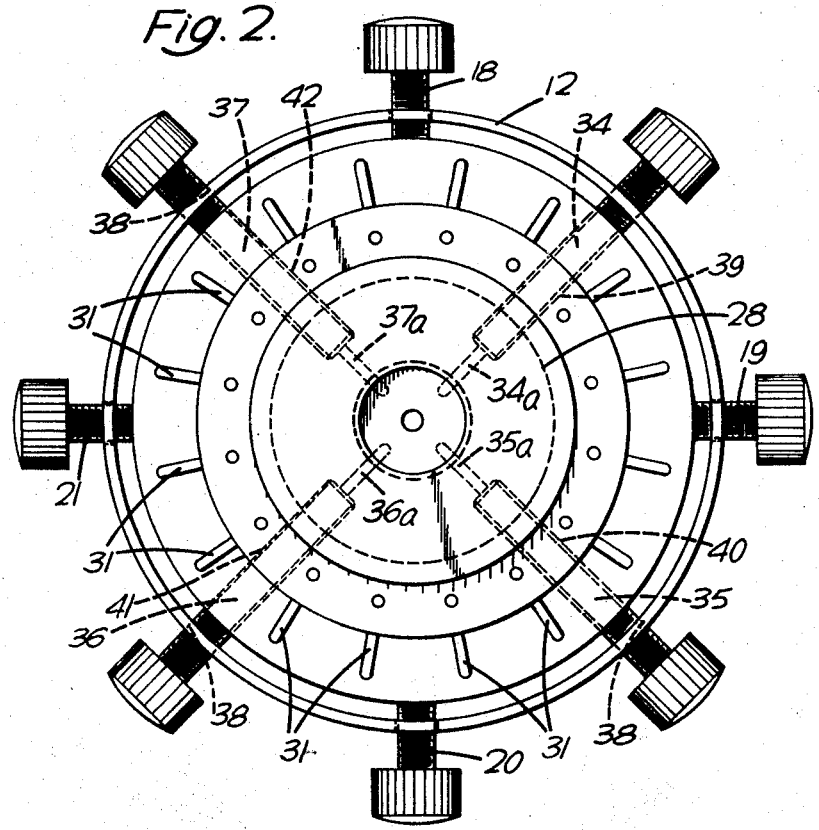

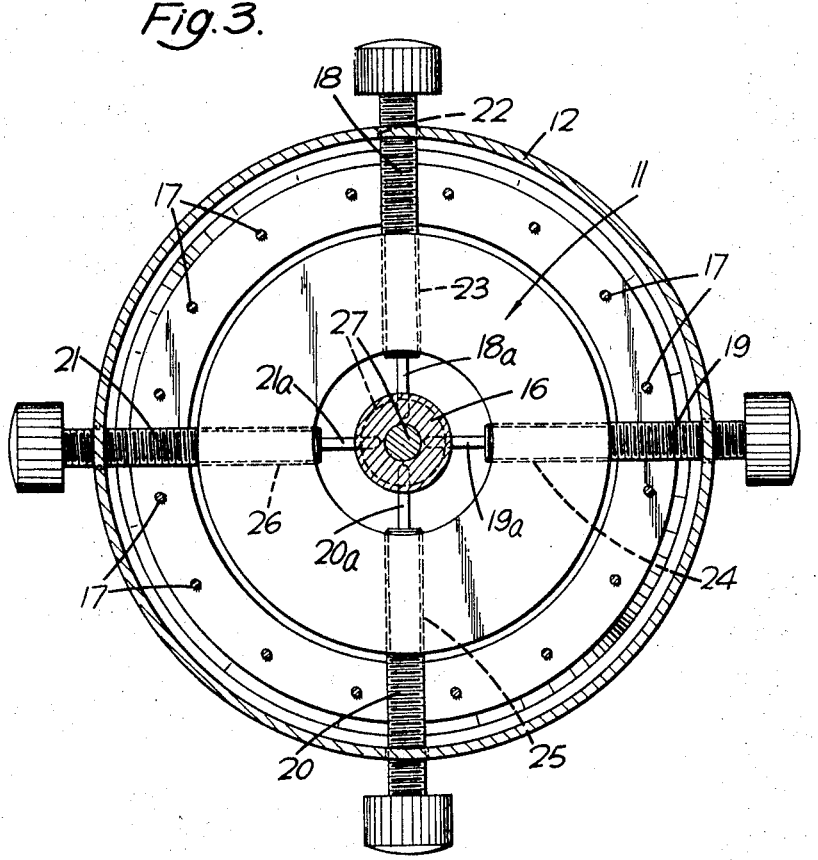

United States Patent Office 3,529,841
Patented Sept. 22, 1970

3,529,841
ALIGNMENT DEVICES
Kenneth Frank Hall, Barnet, England, assignor to W. Watson & Sons Limited, Barnet, England, a British company
Filed Aug. 30, 1968, Ser. No. 756,537
Claims priority, application Great Britain, Sept. 7, 1967, 41,015/67
Int. Cl. B23b *31/36*
U.S. Cl. 279—6     4 Claims

ABSTRACT OF THE DISCLOSURE

A chuck device comprises a rotatable body, an intermediate ring and a holding member for holding a lens cell. The ring is connected to the body by flexible rods parallel to the axis of the chuck, and to the holding member by flexible rods inclined to the axis. A first set of adjusting rods may move the ring transverse to said axis and a second set of adjusting rods may tilt the holding member, so that the optical axis of a lens in said cell may be aligned with said axis.

---

Figure 1:
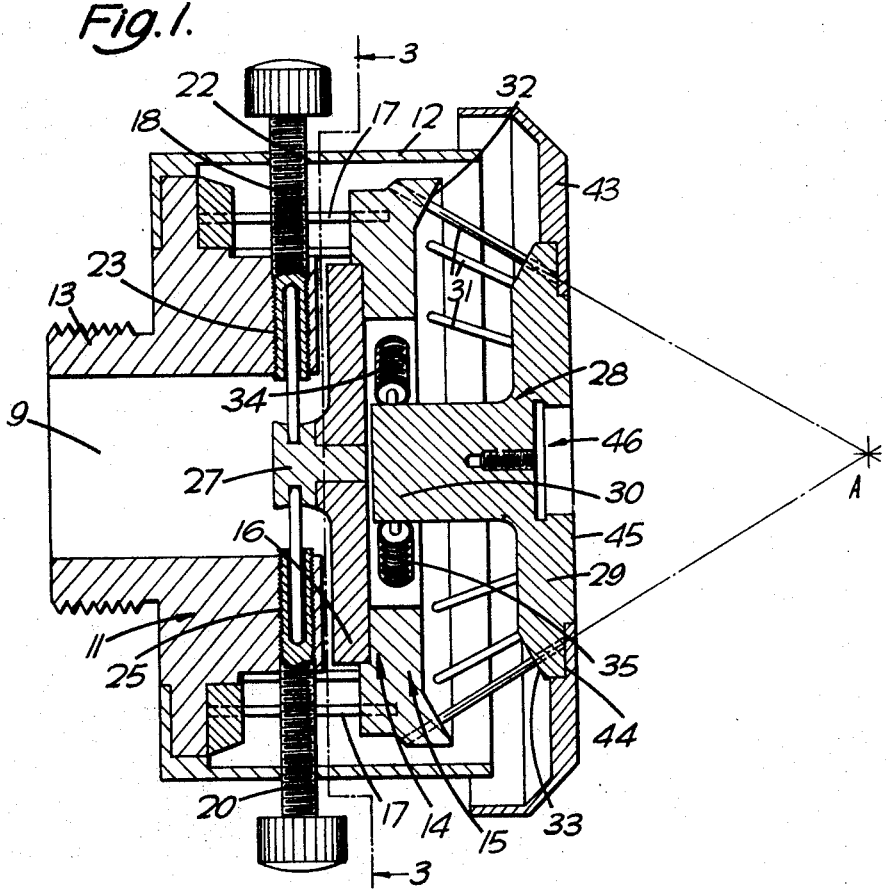

The invention relates to alignment devices.

The invention provides an alignment device for holding an object and aligning it with a first axis, which device comprises a body member providing said first axis, a holding member attached to the body member and adapted to receive the said object, and adjusting means for moving the holding member relative to the body member both transverse to said first axis and about a second axis at right angles to said first axis.

Preferably, the holding member may be moved in two perpendicular directions transverse to said first axis and preferably it may be moved about two perpendicular axes at right angles to said first axis.

Preferably, flexible supporting means are provided for connecting the holding member to the body member.

Preferably, an intermediate member is positioned between the holding member and the body member and is connected to both the body member and the holding member by flexible supporting means. Preferably, the flexible supporting means comprises a plurality of flexible rods. Preferably, the adjusting means includes a plurality of screw threaded adjusting rods.

Preferably, adjusting rods act on the intermediate member to displace it, and thereby the holding member, transverse to the said first axis.

Preferably, adjusting rods are provided to move the holding member relative to the intermediate member to effect limited rotation of the holding member about each axis perpendicular to the first axis. Preferably, the adjusting rods act transversely on a part of the holding member remote from its connection with the supporting rods to effect said limited rotation.

Means may be provided to machine the surface of the object when held in the device and aligned with the first axis. Means may also be provided for rotating the device about the first axis.

A specific construction of chuck device embodying the invention will now be described, by way of example, and with reference to the accompanying drawings in which:

FIG. 1 is a sectional side view of the chuck device;
FIG. 2 is a front view of the device with the cover removed; and
FIG. 3 is a section on the line 3—3 of FIG. 1.

The chuck device of this example is for holding a lens cell into which an optical lens is secured so that the lens cell (carrying the lens) can be adjusted until the lens axis coincides with, and is aligned with, the axis of the chuck device. In this condition machining can be carried out on the cell. In one specific application of this chuck device the lens cell is in the form of a short cylinder and it is necessary for the periphery of the cell to be machined so that the axis of the cell coincides with the axis of the lens. It is also necessary for the ends of the lens cell to be machined so that they are perpendicular to the axis of the lens. The complete lens assembly consists of a number of lens cells each machined relative to its lens axis, inserted into a close fitting sleeve. In this way the axes of all the lenses are made coincident.

The chuck device includes a tubular body member 11 to which is attached a generally cylindrical back cover 12. An externally screw threaded boss 13 projects centrally from the rear face of the body member 11. An intermediate member 14, comprising an annular ring 15 fixed to a disc member 16, is attached to the body member 11 by sixteen flexible steel rods 17 all lying parallel to the axis 9 of the chuck device. One end of each rod 17 is fitted into a hole in the body member 11 and the other end is fitted into a hole in the ring 15. Four externally screw threaded adjusting rods 18, 19, 20 and 21 pass through apertures 22 in the back cover 12, and engage screw threaded holes 23, 24, 25 and 26 respectively in the body member 11. Four kinematic bars 18a, 19a, 20a and 21a, each associated with a respective one of the rods 18–21, abut a backwardly projecting boss 27 on the disc member 16 and are received in recesses in the ends of the rods 18–21 so as to transmit movement of the rods 18–21 to the boss 27. The four rods 18–21 are arranged perpendicular to each other so that by selective rotation of them, the intermediate member 14 may be moved bodily in any direction transverse to the axis 9 of the chuck device. The use of the bars 18a–21a avoids sliding movements which might otherwise be caused if the screw threaded rods abutted the boss 27 directly.

A holding member 28, on which a lens cell may be mounted, comprises a disc portion 29 and a cylindrical stub 30 projecting rearwardly to within the ring 15. The member 28 is connected to the intermediate member 14 by sixteen flexible steel rods 31. The rods 31 are distributed around a circle and all lie at an angle to the axis 9 of the chuck device.

The front face of the ring 15 is dished to provide an annular surface 32 inclined at an angle of about 60° to the axis 9. The rear face of the holding member has an annular face 33 also inclined to the axis 9 so as to lie substantially parallel to the surface 32. The rods 31 each have one end received in a hole in the surface 32, and the other end is a hole in the face 33. Four externally screw threaded adjusting rods 34, 35, 36 and 37 pass through apertures 38 in the back cover 12 and engage screw threaded holes 39, 40, 41 and 42, respectively, in the annular ring 15. Four kinematic bars 34a–37a, each associated with one of the rods 34–37, transmit movement from the rods 34–37 to the stub 30. The bars 34a–37a are similar to the above mentioned bars 18a–21a. The four rods 34–37 are arranged perpendicular to each other and are each at 45° to one of the rods 18–21. Movement of any of the rods 34–37 to displace the stub 30 causes tilting movement of the holding member 28 relative to the axis 9 as the point at which the rods 34–37 act on the stub 30 is axially removed from the position at which the holding member 28 is connected to the rods 31. By selective rotation of the rods 34–37, the holding member may be tilted to a limited extent about any axis passing through the point A perpendicular to the axis 9.

A front cover 43 is secured to an annular shoulder 44 on the holding member 28 so that the front of the cover lies flush with a flat front face 45 of the holding member 28. A cylindrical recess 46 is provided centrally in front of the holding member 28, the axis of the recess 46 being aligned with the axis of the stub 30.

In use, the chuck device is mounted on a vertical lathe so that the screw threaded boss 13 is engaged with a rotary driving member of the lathe and the axis 9 extends vertically. A lens is fixed to one end of a generally cylindrical lens cell with the optical axis of the lens substantially aligned with the axis of the lens cell. The lens cell is then mounted on the above described chuck device and secured in position by suitable means. The lens cell is secured to the chuck device by means of an adaptor which is located in position on the chuck device by the front face 45 and recess 46 of the holding member 28. The length of the adaptor is made so that when the lens cell is secured in position, the centre of curvature of one of the lens surfaces will virtually coincide with the point A.

Using known optical means to observe the movement of the lens surface, the adjusting rods 18, 19, 20 and 21 are operated until it is seen that the lens surface whose centre of curvature lies at point A has its axis coincident with the axis 9. The second lens surface is now observed and the rods 34, 35, 36 and 37 are operated until the axis of this surface also coincides with the axis 9. In this tilting movement the setting of the first lens surface is not disturbed, because it is rotating about its centre of curvature.

When the axes are thus aligned, the lathe is operated to rotate the chuck about the axis 9 and a cutting tool on the lathe is used to machine the exterior surface of the lens cell to make it coaxial with the axis 9 and the axis of the lens and the ends of the cell are machined to make them perpendicular to the axis 9 and the axis of the lens.

In the above example, pairs of opposing screw threaded rods are used to effect the adjusting movements so as to enable the chuck movements to be clamped to counteract machining stresses and to prevent "chatter" due to the chuck being supported on flexible rods.

I claim:

1. An alignment device for holding an object and aligning it with a first axis, which device comprises a body member providing said first axis, a holding member adapted to receive the said object, an intermeditae member positioned between the holding member and the body member, a first set of flexible rods extending parallel to said first axis connecting the intermediate member to the body member, a second set of flexible rods inclined to said first axis connecting the holding member to the intermediate member, and adjusting means for moving the holding member relative to the body member both transverse to said axis and about a fixed axis at right angles to said first axis.

2. An alignment device as claimed in claim 1 in which said adjusting means comprises a first set of screw threaded adjusting rods acting on the intermediate member to move it transverse to said first axis and a second set of screw threaded adjusting rods acting on a part of said holding member remote from its connection with said second flexible rods so as to tilt it.

3. An alignment device as claimed in claim 1 in which said body member, intermediate member and holding members are each of circular cross section and in which said flexible rods of each set are spaced around a circle surrounding said first axis, the rods of said second set tapering inwardly towards said holding member.

4. An alignment device for holding an object and aligning it with a first axis, said device comprising a body member providing said first axis, a movable holding member adapted to hold said object, an intermediate member between said holding member and body member, first flexible connecting means extending parallel to said first axis and interconnecting the intermediate member and the body member, second flexible connecting means inclined to said first axis and interconnecting the holding member and the intermediate member, first adjusting means for moving the intermediate member transverse to said first axis and second adjusting means for tilting the holding member about a second axis at right angles to the first axis.

References Cited

UNITED STATES PATENTS

| 1,282,037 | 10/1918 | Bugbee | 51—216.2 |
| 2,463,857 | 3/1949 | Dietz | 279—6 |
| 2,598,477 | 5/1952 | Wilberschied | 279—6 |
| 2,809,044 | 10/1957 | Landreth | 279—6 XR |

ROBERT C. RIORDON, Primary Examiner

D. D. EVENSON, Assistant Examiner

U.S. Cl. X.R.

269—60